US010176901B2

(12) United States Patent
Loewen (10) Patent No.: US 10,176,901 B2
(45) Date of Patent: Jan. 8, 2019

(54) SYSTEMS, METHODS, AND FILTERS FOR RADIOACTIVE MATERIAL CAPTURE

(71) Applicant: Eric P. Loewen, Wilmington, NC (US)

(72) Inventor: Eric P. Loewen, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1288 days.

(21) Appl. No.: 13/966,561

(22) Filed: Aug. 14, 2013

(65) Prior Publication Data

US 2015/0049852 A1 Feb. 19, 2015

(51) Int. Cl.
*G21F 9/02* (2006.01)
*G21C 13/02* (2006.01)
(Continued)

(52) U.S. Cl.
CPC .............. *G21F 9/02* (2013.01); *G21C 9/004* (2013.01); *G21C 9/06* (2013.01); *G21C 13/022* (2013.01);
(Continued)

(58) Field of Classification Search
CPC ..... G21F 9/02; G21F 9/04; G21F 9/06; G21F 9/28; G21F 9/30; G21D 3/04; G21C 9/00;
(Continued)

(56) References Cited

U.S. PATENT DOCUMENTS 3,338,665 A    8/1967  Silverman
3,519,537 A *  7/1970  Ferrari ................. G21C 3/17
                                                        376/418
(Continued)

FOREIGN PATENT DOCUMENTS

CN      101700450 A    5/2010
JP        0213897 A    1/1990
(Continued)

OTHER PUBLICATIONS

European Search Report and Opinion issued in connection with corresponding EP Application No. 14180686.9 dated Feb. 20, 2015.
(Continued)

*Primary Examiner* — Sharon M Davis
(74) *Attorney, Agent, or Firm* — Harness, Dickey & Pierce, P.L.C.

(57) ABSTRACT

A system configured to passively filter radioactive materials from a flow may include one or more particulate removal devices; one or more water removal devices; and/or one or more radionuclide removal devices. At least one of the one or more particulate removal devices may mechanically remove particulates of the radioactive materials from the flow. At least one of the one or more water removal devices mechanically may remove water from the flow. At least one of the one or more radionuclide removal devices may remove radioactive aerosols, reactive radioactive gases, or radioactive aerosols and reactive radioactive gases from the flow using engineered filter media. A filter may include a body, including an inlet and an outlet. The body may be configured to store filter media, to contain pressure from gas explosions, and/or to allow the stored filter media to move toward the outlet when pressure at the inlet increases.

15 Claims, 10 Drawing Sheets

(51) Int. Cl.
*G21C 9/004* (2006.01)
*G21F 9/04* (2006.01)
*G21C 9/06* (2006.01)
*G21F 9/06* (2006.01)
*G21F 9/30* (2006.01)

(52) U.S. Cl.
CPC .................. *G21F 9/04* (2013.01); *G21F 9/06* (2013.01); *G21F 9/30* (2013.01); *Y02E 30/40* (2013.01)

(58) Field of Classification Search
CPC ........ G21C 9/008; G21C 9/06; G21C 11/026; G21C 13/022; G21C 13/10; G21C 9/004; B01D 50/002; B01D 46/30
See application file for complete search history.

(56) References Cited

U.S. PATENT DOCUMENTS

| | | | | |
|---|---|---|---|---|
| 3,750,371 | A * | 8/1973 | Gutman | B01D 45/08 122/483 |
| 3,890,233 | A * | 6/1975 | Gischel | B01D 29/96 210/237 |
| 3,958,630 | A | 5/1976 | Smith | |
| 3,961,923 | A * | 6/1976 | Zia Rouhani | B01D 45/12 376/371 |
| 3,964,887 | A * | 6/1976 | Hickey | B01D 53/02 376/314 |
| 4,000,993 | A | 1/1977 | Holl | |
| 4,153,432 | A | 5/1979 | Beman et al. | |
| 4,163,649 | A | 8/1979 | Calvert | |
| 4,261,713 | A | 4/1981 | Bourdois et al. | |
| 4,266,951 | A | 5/1981 | Calvert | |
| 4,284,609 | A | 8/1981 | deVries | |
| 4,297,116 | A * | 10/1981 | Cusick | B01D 46/002 55/319 |
| 4,345,916 | A | 8/1982 | Richards et al. | |
| 4,369,048 | A * | 1/1983 | Pence | B01D 53/0473 376/314 |
| 4,428,904 | A * | 1/1984 | Kuhnel | G21C 9/004 376/283 |
| 4,432,777 | A * | 2/1984 | Postma | B01D 47/021 261/122.1 |
| 4,531,953 | A | 7/1985 | Groose et al. | |
| 4,544,379 | A | 10/1985 | Elliott et al. | |
| 4,675,031 | A | 6/1987 | Sinnar | |
| 4,873,050 | A * | 10/1989 | Eckardt | G21C 9/004 376/283 |
| 5,017,331 | A | 5/1991 | Eckardt | |
| 5,171,519 | A | 12/1992 | Corpora et al. | |
| 5,215,708 | A * | 6/1993 | Fennern | G21C 15/18 376/293 |
| 5,688,402 | A | 11/1997 | Green et al. | |
| 5,814,118 | A | 9/1998 | Wickland et al. | |
| 6,344,071 | B1 | 2/2002 | Smith et al. | |
| 6,372,024 | B1 * | 4/2002 | Prescott | B01D 19/0005 55/473 |
| 7,267,805 | B2 | 9/2007 | Brück et al. | |
| 2003/0121869 | A1 | 7/2003 | Jang et al. | |
| 2006/0188055 | A1 * | 8/2006 | Eckardt | B01D 47/10 376/283 |
| 2007/0274886 | A1 | 11/2007 | Benson et al. | |
| 2010/0126349 | A1 | 5/2010 | Vermeulen | |
| 2011/0132817 | A1 * | 6/2011 | Gardner | B01D 29/15 210/90 |
| 2012/0051488 | A1 | 3/2012 | Eckardt et al. | |
| 2012/0111200 | A1 | 5/2012 | Gauthier et al. | |
| 2013/0182812 | A1 | 7/2013 | Eckardt et al. | |

FOREIGN PATENT DOCUMENTS

| | | |
|---|---|---|
| JP | 03051800 A | 3/1991 |
| JP | H03-75598 A | 3/1991 |
| JP | 04505802 A | 10/1992 |
| JP | 06347593 A | 12/1994 |
| JP | 2004191347 A | 7/2004 |
| JP | 2009513926 A | 4/2009 |
| TW | 201212043 A1 | 3/2012 |
| WO | 9016071 A1 | 12/1990 |
| WO | 2005/087343 A1 | 9/2005 |
| WO | 2012025174 A1 | 3/2012 |

OTHER PUBLICATIONS

A. G. B. M. Sasse et al. "Particle Filter Based on Thermophoretic Deposition from Natural Convection Flow"; Aerosol Science and Technology; Jun. 2007.

W. Luangdilok "Modeling of the Venturi Scrubber for the FILTRA-MVSS System"; Nuclear Insights, vol. 3, No. 3; Summer 2009.

B. Eckardt "Containment Venting Sliding Pressure Venting Process for PWR and BWR Plants Process Design and Test Results"; 21st DOE/NRC Nuclear Air Cleaning Conference, KWU Group of Siemens AG; Germany.

Fretz, B. "Filtered Containment Venting Systems". Advisory Committee on Reactor Safeguards; Fukushima Subcommittee; Oct. 3, 2012.

"Order to Modify Licenses With Regard to Reliable Hardened Containment Vents, EA-12-050"; United States of America Nuclear Regulatory Commission; Mar. 12, 2012.

"Order to Modify Licenses With Regard to Reliable Hardened Containment Vents Capable of Operation Under Severe Accident Conditions, EA-13-109"; United States of America Nuclear Regulatory Commission; Jun. 6, 2013.

"Filtered Containment Venting System: Proven Technology—Passive Operation"; AREVA Inc.; Maryland, USA; 2011.

Brenner, H. "Unsolved Problems in Fluid Mechanics: On the Historical Misconception of Fluid Velocity as Mass Motion, Rather than Volume Motion". Department of Chemical Engineering, Massachusetts Institute of Technology; Cambridge, MA 02139.

H. Allelein et al. "State-of-the-Art Report on Nuclear Aerosols"; Nuclear Energy Agency, Committee on the Safety of Nuclear Installations; Dec. 17, 2009.

Unofficial English translation of Japanese office action issued in connection with corresponding JP Application No. 2014-157317 dated Jun. 28, 2016.

Machine Translation and Notification of Reasons for Refusal issued in connection with corresponding JP Application No. 2016-189000 dated Nov. 7, 2017.

Office Action and Search issued in connection with corresponding TW Application No. 103126737 dated Nov. 14, 2017.

* cited by examiner

FIG. 1

(Related Art)

SYSTEMS, METHODS, AND FILTERS FOR RADIOACTIVE MATERIAL CAPTURE

BACKGROUND

1. Field

Example embodiments generally relate to mechanical connections and methods. Example embodiments also relate to nuclear power plants and to mechanical connections and methods for repairing piping within reactor pressure vessels of the nuclear power plants.

2. Description of Related Art

Nuclear power plants may include filtered venting system to mitigate off-site release of radioactivity during a severe nuclear accident (e.g., partial or complete meltdown of reactor core, breach of reactor vessel by molten core debris) or any other time venting from the containment needs to be filtered (e.g., prolonged station blackout ("SBO"), loss of active containment heat removal capability, beyond-design-basis events). Such venting or depressurizations of the containment, whether from a wetwell or a drywell, may release radioactive materials in gaseous, liquid, and/or solid (e.g., particulate) form.

As would be understood by a person having ordinary skill in the art ("PHOSITA"), in the event of a severe nuclear accident, fission products may be released into the containment of the nuclear power plant. Of significant concern to the public are fission products of an aerosol nature, should such fission products escape the containment (according to the State-of-the-Art Report on Nuclear Aerosols dated Dec. 17, 2009, most radioactive material that may escape from a nuclear power plant during a severe nuclear accident will do so in the form of aerosols). Such fission products may include, for example, noble gases (e.g., krypton, xenon), halogens (e.g., bromine, iodine), alkali metals (e.g., cesium, potassium, rubidium), tellurium group (e.g., antimony, selenium, tellurium), barium, strontium, noble metals (e.g., cobalt, palladium, molybdenum, rhodium, ruthenium, technetium), cerium group (e.g., cerium, neptunium, plutonium), and lanthanides (e.g., americium, curium, europium, lanthanum, neodymium, nobelium, praseodymium, promethium, samarium, yttrium, zirconium).

Partially as a result of the Mar. 11, 2011, disaster at the Fukushima Dai-ichi Nuclear Power Plant site, the Nuclear Regulatory Commission ("NRC") prescribed reliable hardened containment venting systems ("HCVS") for many nuclear power plants (see NRC's "Order to Modify Licenses With Regard to Reliable Hardened Containment Vents, EA-12-050" dated Mar. 12, 2012). Such HCVSs may be required to include engineered filters (see NRC's "Order Modifying Licenses With Regard to Reliable Hardened Containment Vents Capable of Operation Under Seer Accident Conditions, EA-13-109" dated Jun. 6, 2013).

Figure 1:
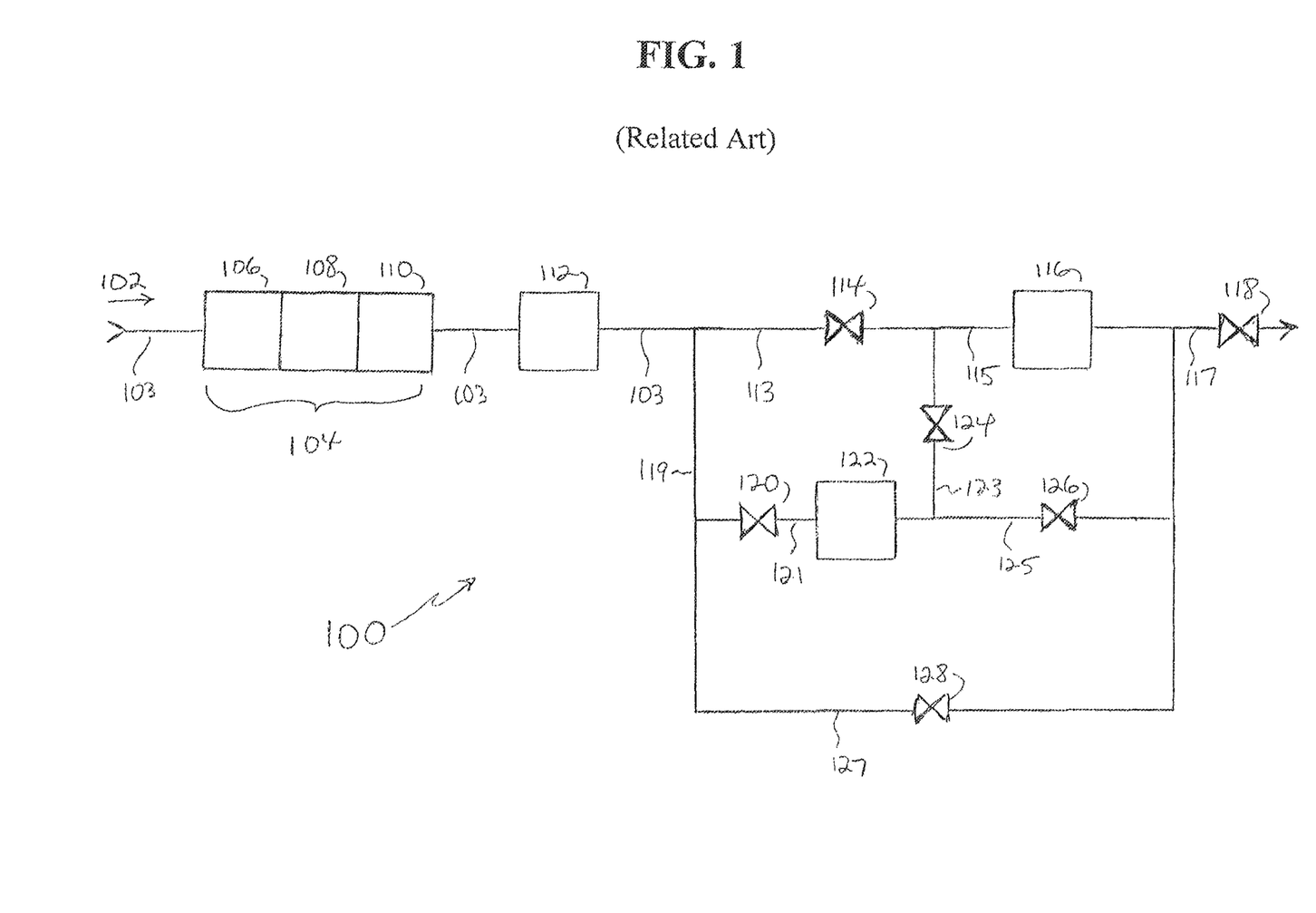
FIG. 1 is a block diagram of a related art system for radioactive material capture.

FIG. 1 is a block diagram of a related art system 100 for radioactive material capture.

As shown in FIG. 1, flow 102 (e.g., a gas stream) of radioactive material (e.g., radioactive discharge from a nuclear power plant) may enter system 100 (e.g., an "off-gas" system). Flow 102 may include radioactive material in the form of gases, liquids, and/or solids.

Flow 102 in first piping 103 may enter recombination subsystem 104, including preheater 106, recombiner 108, and first condenser 110. Preheater 106 may heat flow 102 to improve efficiency of a hydrogen recombination process in recombiner 108. Recombiner 108 may house the hydrogen recombination process. First condenser 110 may cool flow 102 to remove entrained water.

Flow 102 may continue in first piping 103 through second condenser 112 to further cool flow 102. By the time flow 102 leaves second condenser 112, it may be virtually without entrained water (e.g., "dry").

Flow 102 in second piping 113 then may pass through first valve 114 and via third piping 115 to charcoal adsorption beds 116. After leaving charcoal adsorption beds 116, flow 102 in fourth piping 117 may proceed via second valve 118 to a stack (not shown) and the environment.

As shown in FIG. 1, flow 102 to charcoal adsorption beds 116 may bypass first valve 114 (or run in parallel with first valve 114) via fifth piping 119, third valve 120, sixth piping 121, guard vessel 122, seventh piping 123, and fourth valve 124. Flow 102 may bypass first valve 114 and charcoal adsorption beds 116 (or run in parallel with first valve 114 and charcoal adsorption beds 116) via fifth piping 119, third valve 120, sixth piping 121, guard vessel 122, eighth piping 125, and fifth valve 126. Flow 102 may bypass first valve 114, charcoal adsorption beds 116, and/or guard vessel 122 (or run in parallel with first valve 114, charcoal adsorption beds 116, and/or guard vessel 122) via ninth piping 127 and sixth valve 128. These and other potential combinations of paths for flow 102 in system 100 would be understood by a PHOSITA.

Charcoal adsorption beds 116 may provide the necessary Decontamination Factor ("DF") of radioactive materials such as iodine and cesium. Removing water from flow 102 prior to passing through charcoal adsorption beds 116 may improve the DF (e.g., dewatering flow 102 before entering "dry" charcoal adsorption beds 116). Increasing the time flow 102 spends within charcoal adsorption beds 116 (e.g., residence time) may improve the DF.

System 100 is an example of an active system in that it requires, for example, pumps and associated supplies of power (not shown), external cooling (not shown), and the replacement of charcoal adsorption beds 116.

Figure 2:
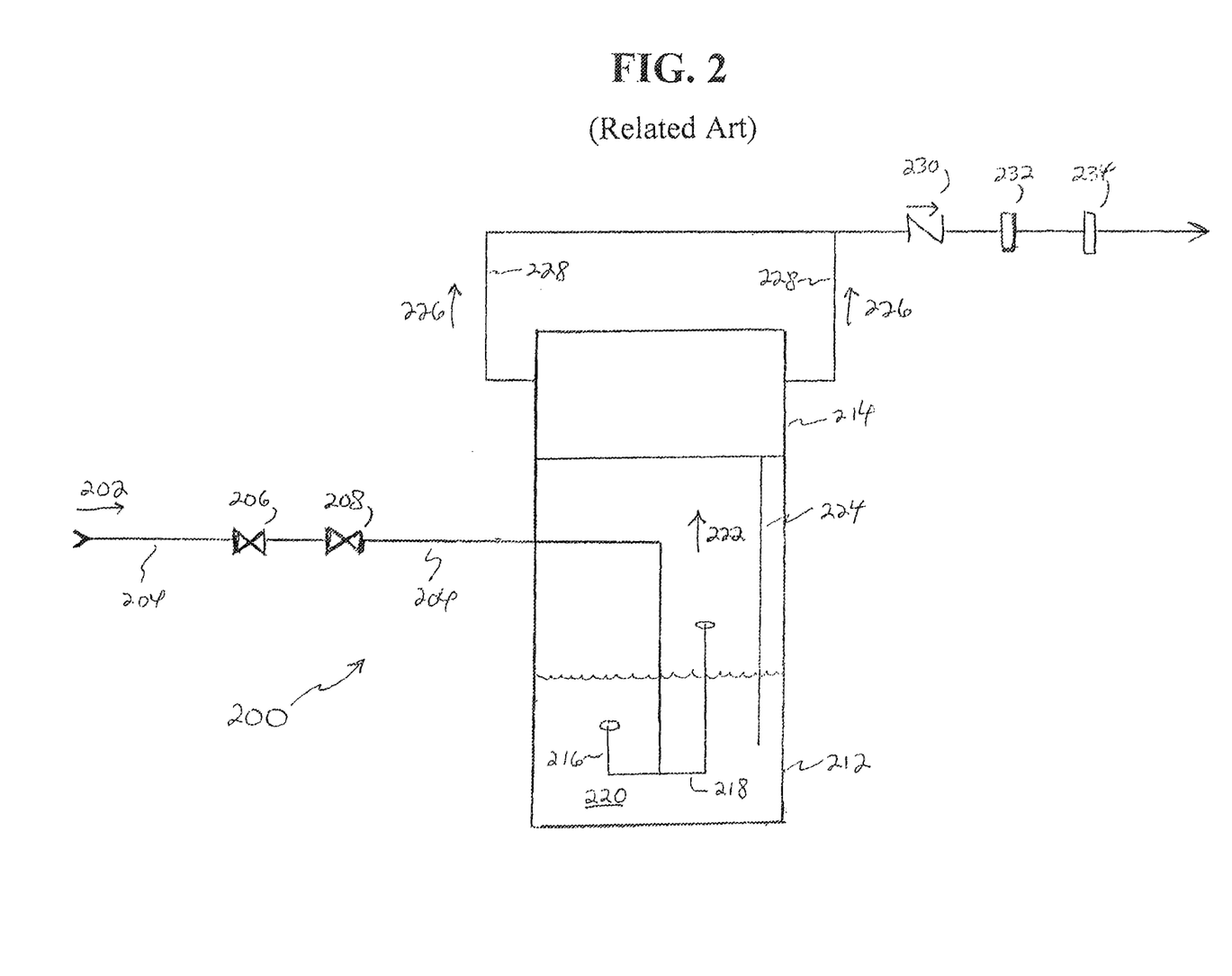
FIG. 2 is a block diagram of a related art system for radioactive material capture.

FIG. 2 is a block diagram of a related art system 200 for radioactive material capture.

As shown in FIG. 2, flow 202 in tenth piping 204 may pass through first isolation valve 206 and second isolation valve 208 to pressure vessel 210. Pressure vessel 210 may include lower high-speed venturi section 212 and upper metal fiber filter section 214.

Inside pressure vessel 210, tenth piping 204 may split into eleventh piping 216 and twelfth piping 218, both leading to high-speed venturi section 212. Eleventh piping 216 may be designed to support submerged venturi scrubber operation (e.g., below a surface of pool of water 220), while twelfth piping 218 may be designed to support unsubmerged venturi scrubber operation (e.g., above the surface of pool of water 220).

Flow 202 may enter pool of water 220 through a plurality of venturi nozzles (not shown), which may act as eductors to cause water from pool of water 220 to become entrained in flow 202. This entrainment may scrub aerosols and iodine from flow 202 and may store them in pool of water 220. Chemicals may be added to pool of water 220 to improve performance of lower high-speed venturi section 212. The water in pool of water 220 may be recirculated to the containment (not shown).

Scrubbed flow 222 may pass to upper metal fiber filter section 214. Upper metal fiber filter section 214 may include droplet separator (not shown), micro-aerosol filter (not shown), and iodine adsorption filter (not shown). Droplet return line 224 may route separated droplets back to pool of water 220.

Scrubbed and filtered flow 226 may pass via thirteenth piping 228, check valve 230, orifice 232, and rupture diaphragm 234 to a stack (not shown) and the environment.

Attainment of a high DF with system 200 may present problems. For example, the DF may be affected by the rate of flow 202, the temperature of pool of water 220, the pressure of pool of water 220, the residence time of gases in pool of water 220, the size of bubbles in the gases, and/or physical dimensions of pressure vessel 210, lower high-speed venturi section 212, and/or upper metal fiber filter section 214. System 200 also may present problems associated with initial cost, a large footprint, expense of operation, expense of maintenance, and/or internal blockage. Additionally, the DF of system 200 may not be able to be changed after installation of pressure vessel 210. Moreover, while in operation, pool of water 220 may require makeup water at least one per week (as stated by the manufacturer in sales brochures), so that operation of system 200 is not independent of required operator action.

A need exists for a fully passive systems, methods, and filters for radioactive material capture of gases, liquids, and/or solids to mitigate off-site release of radioactivity during a severe nuclear accident or any other time venting from the containment needs to be filtered.

Related art systems, methods, and/or filters for radioactive material capture are discussed, for example, in U.S. Pat. No. 5,688,402 to Green et al. ("the '402 patent"), as well as U.S. Patent Publication No. 2011/0132817 A1 to Gardner et al. ("the '817 publication"). The disclosures of the '402 patent and the '817 publication are incorporated in this application by reference in their entirety.

SUMMARY

Example embodiments may provide systems for radioactive material capture. Example embodiments may provide methods for radioactive material capture. Example embodiments may provide filters for radioactive material capture.

In some example embodiments, a system configured to passively filter radioactive materials from a flow may comprise one or more particulate removal devices; one or more water removal devices; and/or one or more radionuclide removal devices. At least one of the one or more particulate removal devices may mechanically remove particulates of the radioactive materials from the flow. At least one of the one or more water removal devices mechanically may remove water from the flow. At least one of the one or more radionuclide removal devices may remove radioactive aerosols, reactive radioactive gases, or radioactive aerosols and reactive radioactive gases from the flow using engineered filter media.

In some example embodiments, the radioactive materials may comprise one or more of reactive gaseous radioactive materials, liquid radioactive materials, and particulate radioactive materials.

In some example embodiments, in a direction of the flow, the one or more particulate removal devices may precede the one or more water removal devices.

In some example embodiments, in a direction of the flow, the one or more particulate removal devices may precede the one or more radionuclide removal devices.

In some example embodiments, in a direction of the flow, the one or more water removal devices may precede the one or more radionuclide removal devices.

In some example embodiments, the at least one of the one or more particulate removal devices may mechanically remove the particulates of the radioactive materials from the flow using gravitational settling.

In some example embodiments, in the at least one of the one or more water removal devices, mixing of the flow may reduce thermophoretic forces within the flow.

In some example embodiments, in the at least one of the one or more water removal devices, heat rejection from the flow may reduce thermophoretic forces within the flow.

In some example embodiments, in the at least one of the one or more radionuclide removal devices, mixing of the flow may reduce thermophoretic forces within the flow.

In some example embodiments, in the at least one of the one or more radionuclide removal devices, heat rejection from the flow may improve capture by reducing thermophoretic forces within the flow.

In some example embodiments, the filter media may comprise one or more of activated alumina ($Al_2O_3$), activated charcoal, organic wax, and plastic.

In some example embodiments, the filter media may comprise one or more high-efficiency particulate air (HEPA) filters.

In some example embodiments, a method for passively filtering radioactive materials from a flow may comprise mechanically removing particulates of the radioactive materials from the flow; mechanically removing water from the flow; and/or removing radioactive aerosols, reactive radioactive gases, or radioactive aerosols and reactive radioactive gases from the flow using filter media.

In some example embodiments, the mechanically removing of the particulates of the radioactive materials from the flow may precede the mechanically removing of the water from the flow.

In some example embodiments, the mechanically removing of the particulates of the radioactive materials from the flow may precede the removing of the radioactive aerosols, reactive radioactive gases, or radioactive aerosols and reactive radioactive gases from the flow using the filter media.

In some example embodiments, the mechanically removing of the water from the flow may precede the removing of the radioactive aerosols, reactive radioactive gases, or radioactive aerosols and reactive radioactive gases from the flow using the filter media.

In some example embodiments, a filter may comprise a body, including an inlet and an outlet. The body may be configured to store filter media. The body may be further configured to contain pressure from gas explosions. The body may be further configured to allow the stored filter media to move toward the outlet when pressure at the inlet increases.

In some example embodiments, movement of the stored filter media toward the outlet when the pressure at the inlet increases may absorb energy associated with the increase in the pressure at the inlet.

In some example embodiments, movement of the stored filter media toward the outlet when the pressure at the inlet increases may reduce pressure increase at the outlet associated with the increase in the pressure at the inlet.

In some example embodiments, the body may be further configured to allow at least a portion of the stored filter media to exit the filter when the pressure at the inlet increases, while preventing release of the at least a portion of the stored filter media to the environment.

In some example embodiments, the filter may further comprise a second outlet. The body may be further configured to allow at least a portion of the stored filter media to exit the filter via the second outlet when the pressure at the inlet increases, while preventing release of the at least a portion of the stored filter media to the environment.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION OF EXAMPLE EMBODIMENTS

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The term "thermophoresis" (also known as thermodiffusion) means a phenomenon observed in mixtures of mobile particles in which different particle types exhibit different responses to the force of a temperature gradient. Due to this thermophoresis phenomenon, small radioactive particles suspended or flowing in a gas in which temperature gradient exists may move differently than the gas flow.

The term "thermophoretic force" means force associated with the thermophoresis phenomenon. For example, small particles within a gas stream may create a fast flow away from a hot source due to an acquired higher kinetic energy due to their higher temperature. Thermophoretic forces may be observed at a scale of one millimeter or less.

Thermodiffusion may be considered "positive" when particles move from a hotter region to a colder region and "negative" when the reverse is true. Larger/more massive species in a mixture typically exhibit positive thermophoretic behavior while smaller/less massive species typically exhibit negative behavior. In addition to size and/or mass, steepness of the temperature gradient, heat conductivity of the species, heat absorption of the species, and other factors may play a role in the thermodiffusion. Because thermophoretic forces may cause different particle types to move differently under the force of a temperature gradient, the associated forces may be used to separate particle types after they've been mixed together, or prevented from mixing if they're already separated.

Reference will now be made to example embodiments, which are illustrated in the accompanying drawings, wherein like reference numerals may refer to like components throughout.

Figure 3:
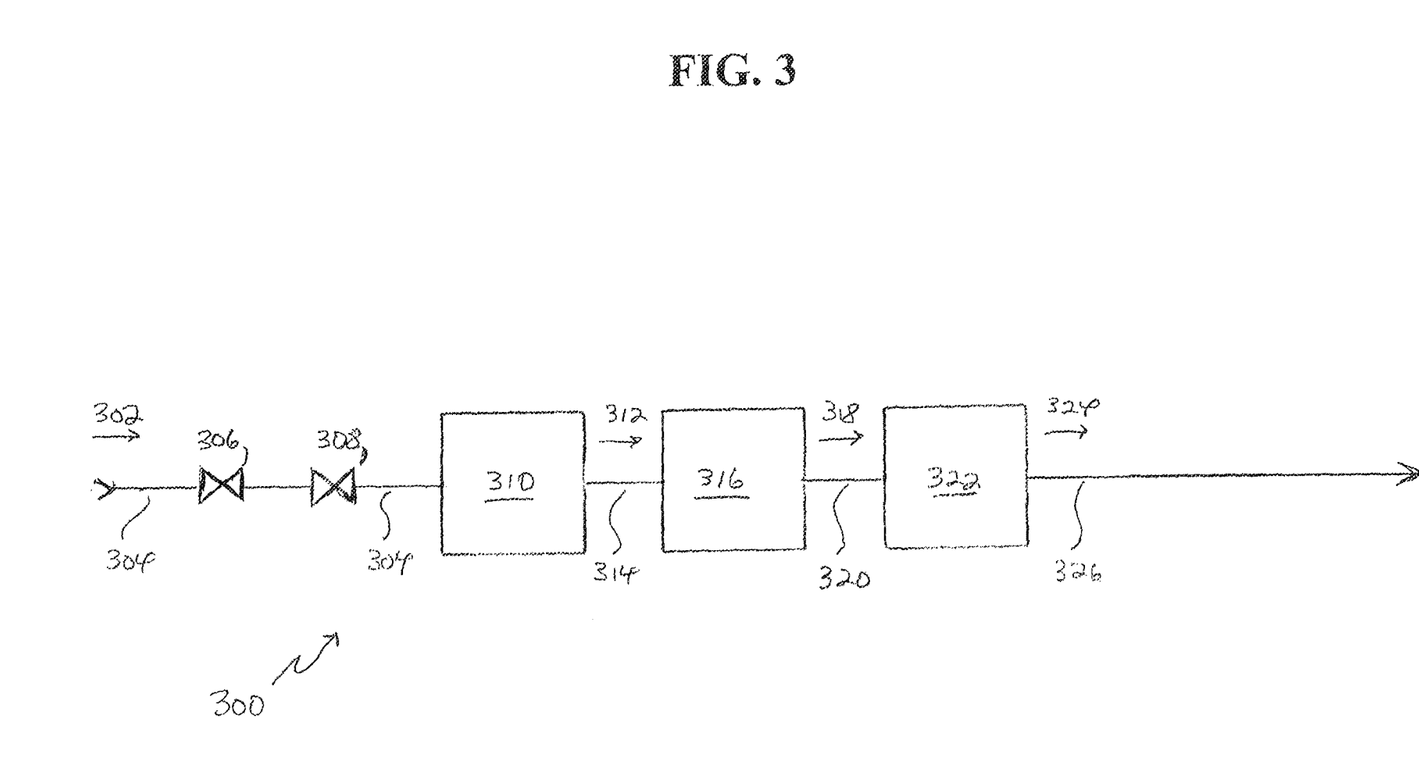
FIG. 3 is a block diagram of a system for radioactive material capture according to some example embodiments.

FIG. 3 is a block diagram of system 300 for radioactive material capture according to some example embodiments. System 300 may be a passive system, capable of operating independent of required operator action until plant stability after a severe nuclear accident is regained by the operators, which may be measured in months, not mere days. System 300 may overcome deficiencies of related art systems, for example, by dewatering vented radioactive gas and using dry capture on the dewatered, vented radioactive gas.

As shown in FIG. 3, flow 302 in fourteenth piping 304 may pass through first isolation valve 306 and second isolation valve 308 to particulate removal device 310. From particulate removal device 310, flow 312 may proceed via fifteenth piping 314 to water removal device 316. From water removal device 316, flow 318 may proceed via sixteenth piping 320 to radionuclide removal device 322. From radionuclide removal device 322, flow 324 may proceed via seventeenth piping 326 to a stack (not shown) and the environment.

Particulate removal device 310 of FIG. 3 may comprise one or more particulate removal devices 310. Water removal device 316 of FIG. 3 may comprise one or more water removal devices 316. Radionuclide removal device 322 of FIG. 3 may comprise one or more radionuclide removal devices 322.

In a direction of the flow (e.g., flow 302, flow 312, flow 318), one or more particulate removal devices 310 may precede one or more water removal devices 316. In a direction of the flow (e.g., flow 302, flow 312, flow 318), one or more particulate removal devices 310 may precede one or more radionuclide removal devices 322. In a direction of the flow (e.g., flow 302, flow 312, flow 318), one or more water removal devices 316 may precede one or more radionuclide removal devices 322.

System 300 of FIG. 3 may comprise one or more particulate removal devices 310, one or more water removal devices 316, and/or one or more radionuclide removal devices 322. One or more particulate removal devices 310, one or more water removal devices 316, and one or more radionuclide removal devices 322 may be arranged in sequence, as shown in FIG. 3, or may be arranged in a different sequence. For example, a first particulate removal device 310 could be followed by a first water removal device 316, a second particulate removal device 310, a second water removal device 316, and first, second, and third radionuclide removal devices 322. Thus, using different arrangements, system 300 may be designed to handle different quantities of aerosols, different size distributions of aerosols, and/or different types of aerosols (e.g., hygroscopic).

One or more particulate removal devices 310 of FIG. 3 may, for example, mechanically remove particulate from flow 302. Such particulate may include, for example, particulates of radioactive materials and/or particulates of non-radioactive material contaminated with imbedded radioactive material. One or more particulate removal devices 310 of FIG. 3 may, for example, mechanically remove particulate from flow 302 using gravitational settling. One or more particulate removal devices 310 may remove a substantial amount of radioactive material from flow 302.

One or more water removal devices 316 of FIG. 3 may, for example, mechanically remove water from flow 312. In one or more water removal devices 316, mixing of flow 312 may reduce thermophoretic forces within flow 312. In one or more water removal devices 316, heat rejection from flow 312 may reduce thermophoretic forces within flow 312. One or more water removal devices 316 may remove a substantial amount of radioactive material from flow 312.

One or more radionuclide removal devices 322 of FIG. 3 may, for example, filter remaining radioactive material from flow 318. Such remaining radioactive material may include, for example, radioactive aerosols (e.g., fine aerosols) and/or reactive radioactive gases (e.g., reactive gas radionuclides). In one or more radionuclide removal devices 322, mixing of flow 318 may reduce thermophoretic forces within flow 318. In one or more radionuclide removal devices 322, heat rejection from flow 318 may improve capture by reducing thermophoretic forces within flow 318. One or more radionuclide removal devices 322 may remove a substantial amount of radioactive material from flow 318.

One or more radionuclide removal devices 322 may comprise engineered filter media. Such engineered filter media may comprise, for example, one or more of activated alumina ($Al_2O_3$), activated charcoal, organic wax, plastic (e.g., recycled plastic products), resins, sand, silica beads, stones, and other capture agents. Such engineered filter media may comprise, for example, a binary mixture of activated alumina and activated charcoal. Such engineered filter media may comprise, for example, one or more HEPA filters.

It has been said that "every filter has a filter gap" (e.g., lower removal efficiencies for target material of particular dimensions). One or more radionuclide removal devices 322 may minimize this "filter gap" problem by putting filters with different filter gaps in series. Thus, one or more radionuclide removal devices 322 may be "tuned" (e.g., selecting filters with specific filter gaps) and/or "stacked" (e.g., putting the tuned filters with different filter gaps in series so as to minimize the "filter gap" problem. Generally, this tuning and/or stacking approach is not effective for noble gases, such as krypton and/or xenon.

Figure 4:
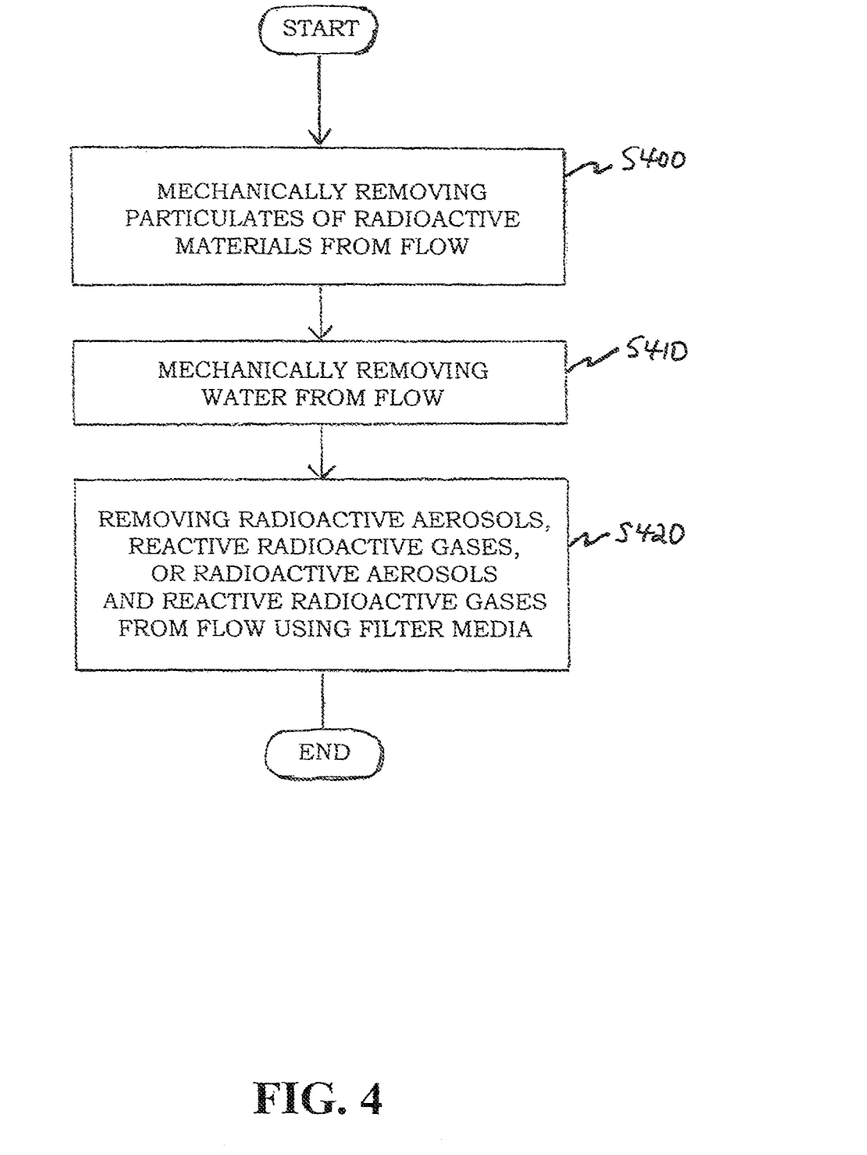
FIG. 4 is a flow chart illustrating a method for radioactive material capture according to some example embodiments.

FIG. 4 is a flow chart illustrating a method for radioactive material capture according to some example embodiments.

The method may be a passive method, capable of operating independent of required operator action until plant stability after a severe nuclear accident is regained by the operators, which may be measured in months, not mere days. The method may overcome deficiencies of related art methods, for example, by dewatering vented radioactive gas and using dry capture on the dewatered, vented radioactive gas.

As shown in FIG. 4, the method may comprise mechanically removing particulates of the radioactive materials from the flow (S400); mechanically removing water from the flow (S410); and removing radioactive aerosols, reactive radioactive gases, or radioactive aerosols and reactive radioactive gases from the flow using filter media (S420). Subsequently, the flow may proceed to a stack and the environment.

Mechanically removing particulates of the radioactive materials from the flow (S400) may remove a substantial amount of radioactive material from the flow. Mechanically removing water from the flow (S410) may remove a substantial amount of radioactive material from the flow. Removing radioactive aerosols, reactive radioactive gases, or radioactive aerosols and reactive radioactive gases from the flow using filter media (S420) may remove a substantial amount of radioactive material from the flow.

Mechanically removing particulates of the radioactive materials from the flow (S400) may precede mechanically removing water from the flow (S410). Mechanically removing particulates of the radioactive materials from the flow (S400) may precede removing radioactive aerosols, reactive radioactive gases, or radioactive aerosols and reactive radioactive gases from the flow using filter media (S420). Mechanically removing water from the flow (S410) may precede removing radioactive aerosols, reactive radioactive gases, or radioactive aerosols and reactive radioactive gases from the flow using filter media (S420).

As shown in FIG. 4, the method may comprise mechanically removing particulates of the radioactive materials from the flow (S400); mechanically removing water from the flow (S410); and removing radioactive aerosols, reactive radioactive gases, or radioactive aerosols and reactive radioactive gases from the flow using filter media (S420), in that order. However, mechanically removing particulates of the radioactive materials from the flow (S400); mechanically removing water from the flow (S410); and removing radioactive aerosols, reactive radioactive gases, or radioactive aerosols and reactive radioactive gases from the flow using filter media (S420) may be arranged in a different sequence. For example, mechanically removing water from the flow (S410) could be followed by mechanically removing particulates of the radioactive materials from the flow (S400), and then removing radioactive aerosols, reactive radioactive gases, or radioactive aerosols and reactive radioactive gases from the flow using filter media (S420).

Additionally, one or more of mechanically removing particulates of the radioactive materials from the flow (S400); mechanically removing water from the flow (S410); and removing radioactive aerosols, reactive radioactive gases, or radioactive aerosols and reactive radioactive gases from the flow using filter media (S420) may be repeated. For example, mechanically removing particulates of the radioactive materials from the flow (S400) could be followed by mechanically removing water from the flow (S410), mechanically removing particulates of the radioactive materials from the flow (a second time), mechanically removing water from the flow (a second time), and then removing radioactive aerosols, reactive radioactive gases, or radioactive aerosols and reactive radioactive gases from the flow using filter media (S420).

In mechanically removing water from the flow (S410), mixing of the flow may reduce thermophoretic forces within the flow. In mechanically removing water from the flow (S410), heat rejection from the flow may reduce thermophoretic forces within the flow.

In removing radioactive aerosols, reactive radioactive gases, or radioactive aerosols and reactive radioactive gases from the flow using filter media (S420), mixing of the flow may reduce thermophoretic forces within the flow. In removing radioactive aerosols, reactive radioactive gases, or radioactive aerosols and reactive radioactive gases from the flow using filter media (S420), heat rejection from the flow may improve capture by reducing thermophoretic forces within the flow.

In removing radioactive aerosols, reactive radioactive gases, or radioactive aerosols and reactive radioactive gases from the flow using filter media (S420), the filter media may comprise, for example, one or more of activated alumina, activated charcoal, organic wax, plastic (e.g., recycled plastic products), resins, sand, silica beads, stones, and other capture agents. The filter media may comprise, for example, a binary mixture of activated alumina and activated charcoal. The filter media may comprise, for example, one or more HEPA filters.

Figure 5:
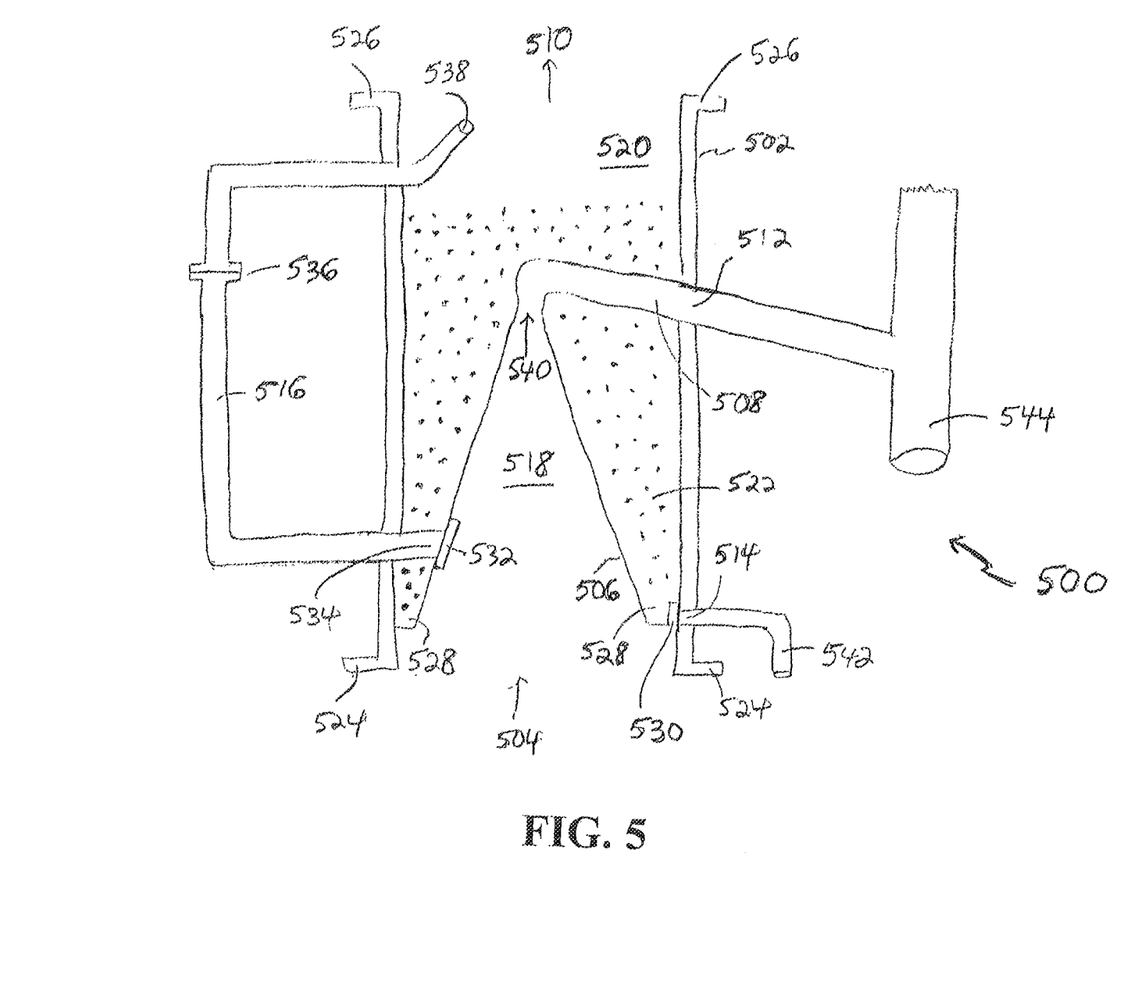
FIG. 5 is a cross-sectional view of a filter according to some example embodiments.

FIG. 5 is a cross-sectional view of a filter 500 according to some example embodiments.

Filter 500 may comprise body 502, first inlet 504, perforated plate 506, discharge line 508, first outlet 510, second outlet 512, third outlet 514, and/or bypass line 516. When installed, filter 500 may be oriented so that first inlet 504 is at the bottom and first outlet 510 is at the top. In such an orientation, vented radioactive gas may enter first inlet 504 and may flow upward toward first outlet 510.

Body 502 may comprise first section 518 on a first side of perforated plate 506 and second section 520 on a second side of perforated plate 506. Body 502 may be configured to store filter media 522 in second section 520. Body 502 may be configured so that stored filter media 522 may exit filter 500 via first outlet 510. Body 502 may be configured so that stored filter media 522 may exit filter 500 only via first outlet 510.

Body 502 may comprise first flange 524 and/or second flange 526. First flange 524 and/or second flange 526 may allow multiple bodies 502 to be stacked and/or secured together in series (e.g., by welding, nuts and bolts, etc.). Such stacking may minimize the "filter gap" problem discussed above. Such stacking may make bodies 502 adaptable to almost any reactor type, unit size, type of containment, or other design parameter without loss of DF performance and/or without the need for requalification of additional bodies 502.

Body 502 may comprise collection tray 528 located, for example, in second section 520 between perforated plate 506 and body 502. Collection tray 528 may be operatively connected to third outlet 514.

When vented radioactive gas enters first inlet 504, it may flow upward through first section 518 toward first outlet 510. As the vented radioactive gas flows upward, it may contact perforated plate 506. Perforated plate 506 may function as a dewatering device and/or a device to capture radioactive material, providing a surface that may allow liquid entrained in the vented radioactive gas to condense and/or gravity flow to collection tray 528, through first screen 530, and on to third outlet 514. Perforated plate 506 may be tapered (e.g., cone shaped) to facilitate dewatering, condensing, and/or gravity flow. Perforated plate 506 may function as a dewatering device in part due to thermophoretic deposition.

After passing through perforated plate 506, the vented radioactive gas may continue to flow upward, entering filter media 522. Filter media 522 may function as a dewatering device and/or a device to capture radioactive material. Filter media 522 may comprise, for example, one or more of activated alumina, activated charcoal, organic wax, plastic (e.g., recycled plastic products), resins, sand, silica beads, stones, and other capture agents. Filter media 522 may comprise, for example, a binary mixture of activated alumina and activated charcoal. Filter media 522 may comprise, for example, one or more HEPA filters. Filter media 522 may allow liquid entrained in the vented radioactive gas to condense. If the liquid condenses and/or coalesces in sufficiently large droplets, the droplets may gravity flow to collection tray 528, through first screen 530, and on to third outlet 514. Filter media 522 may function as a dewatering device in part due to thermophoretic deposition.

After passing through filter media 522, the vented radioactive gas may continue to flow upward, exiting filter 500 via first outlet 510.

Low flow through body 502 may increase the DF of filter 500. In particular, when multiple bodies 502 are stacked in series, low flow through multiple bodies 502 may increase the DF of the stacked filters 500.

In cold weather, below the freezing point of water, low flow through body 502 may result in significant condensation of surfaces of perforated plate 506. Due to the temperature, this condensation may cause flow blockages due to the formation of ice on perforated plate 506. Bypass line 516 may provide a solution to this problem.

As discussed above, when vented radioactive gas enters first inlet 504, it may flow upward through first section 518 toward first outlet 510. Some of the vented radioactive gas also may flow through second screen 532 and second inlet 534, into bypass line 516, and up to rupture disk 536. Second screen 532 may have openings that are, for example, 100 times larger than openings in perforated plate 506 to reduce or prevent blockage of second screen 532. If flow blockage of perforated plate 506 sufficiently raises a pressure of first section 518 relative to second section 520 (e.g., differential pressure across perforated plate 506 and filter media 522), then rupture disk 534 may break, allowing the vented radioactive gas to bypass perforated plate 506 and filter media 522, via bypass line 516 and fourth outlet 538, to second section 520. Bypass line 516 may have significant surface roughness and/or porosity (e.g., with an internal screen mesh) to contribute to radionuclide deposition by diffusion.

When multiple bodies 502 are stacked in series, the vented radioactive gas may proceed to the next body 502 in the stack for further capture of radioactive material.

Due to the potential for high flow rates of vented radioactive gas through filter 500 during beyond-design-basis events, filter 500 may comprise two or more bypass lines 516. Two or more bypass lines 516 may be disposed, for example, circumferentially around filter 500.

When installed, filter 500 may be oriented so that stored filter media 522 is retained in place by gravitation force. Body 502 may be configured to allow stored filter media 522 to move toward first outlet 510 when pressure at first inlet 504 increases. This movement may allow stored filter media 522 to help reduce pressure increase at first outlet 510 associated with the increase in pressure at first inlet 504. This movement may allow stored filter media 522 to help contain pressure increases at first inlet 504, whether slow or fast. This movement may allow stored filter media 522 to help absorb energy associated with increases in pressure at first inlet 504, whether slow or fast. This movement may allow stored filter media 522 to help contain pressure increases at first inlet 504 and/or to help absorb energy associated with increases in pressure at first inlet 504 due, for example, to gas explosions.

Body 502 may be configured to allow at least a portion of stored filter media 522 to exit filter 500 via first outlet 510 when the pressure at first inlet 504 increases, while preventing release of the at least a portion of the stored filter media 522 to the environment. This exiting of at least a portion of stored filter media 522 may allow stored filter media 522 to help contain pressure increases at first inlet 504 and/or to help absorb energy associated with increases in pressure at first inlet 504 due, for example, to gas explosions.

When multiple bodies 502 are stacked in series, body 502 may be configured to allow at least a portion of stored filter media of a preceding filter (not shown) to exit filter 500 via discharge line 508 and second outlet 512 when the pressure at first inlet 504 increases, while preventing release of the at least a portion of the stored filter media of the preceding filter to the environment. For example, a gas explosion may cause at least a portion of stored filter media of a preceding filter to exit that filter and enter first section 518 of body 502.

The at least a portion of stored filter media of a preceding filter may not pass through perforated plate 506. However, the tapered shape of perforated plate 506 may assist in directing the at least a portion of stored filter media of a preceding filter toward throat 540 of perforated plate 506, into discharge line 508, and on to second outlet 512.

Water from third outlet 514 may flow into first manifold 542. The at least a portion of stored filter media of a preceding filter may exit second outlet 512 into second manifold 544.

According to some example embodiments, HEPA filters may be disposed on the first section 518 side of perforated plate 506, on the first section 518 side of second screen 532, and/or on the first section 518 side of throat 540 (openings in perforated plate 506 may be increased in size, for example, by a factor of 100-10,000 to facilitate this use of HEPA filters). Such HEPA filters may remove at least 99.97% of airborne particles $\geq 0.3$ micrometers ($\mu$m) in diameter. HEPA filters' minimal resistance to airflow, or pressure drop, is usually specified around 300 Pa at nominal flow rate. If the flow rate of the vented radioactive gas is excessive and/or the pressure drop exceeds 300 Pa, then the HEPA filters may tear to allow a higher flow rate of the vented radioactive gas. This may prevent flow blockage due to the HEPA filters and/or may allow the vented radioactive gas to flow to the next filter 500.

According to some example embodiments, organic radioactive aerosols (formed by, for example, reaction of radioactive cesium or iodine with organic materials such as paint or wire insulation) may be captured by using standard wax or other tailored organic compounds coated on the second section 520 side of perforated plate 506 (openings in perforated plate 506 may be increased in size, for example, by a factor of 100-10,000 to facilitate this use of standard wax or other tailored organic compounds). The melting point of the standard wax or other tailored organic compounds may be above 50° C. in order to remain solid during hot summer operating months.

The standard wax or other tailored organic compounds may provide "soluble media" into which the radioactive organic material may diffuse, preventing release to the environment. If the flow rate of the vented radioactive gas is excessive and/or the pressure drop exceeds 300 Pa, then the standard wax or other tailored organic compounds may tear to allow a higher flow rate of the vented radioactive gas. Such tearing may increase the surface area of the standard wax or other tailored organic compounds into which the radioactive organic material may diffuse.

In addition to the standard wax or other tailored organic compounds, filter media 522 may be organic material, such as resin beads and/or shredded plastic material, also providing "soluble media" into which the radioactive organic material may diffuse.

Figure 6:
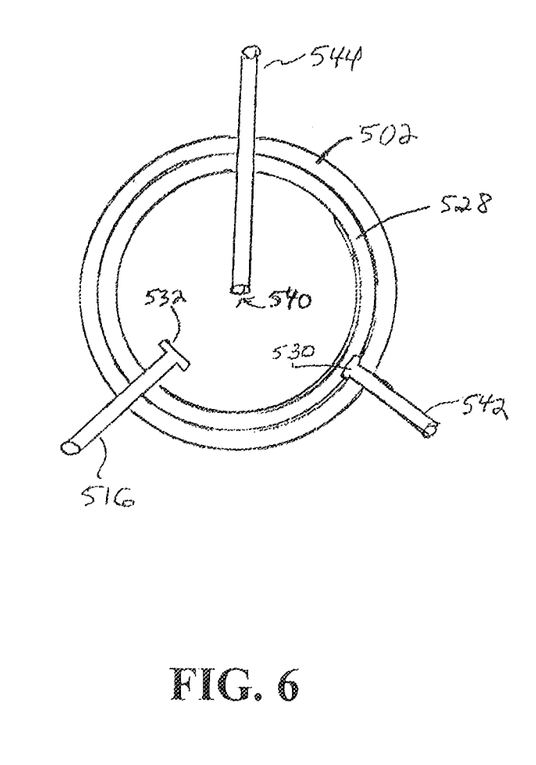
FIG. 6 is a bottom plan view of the filter of FIG. 5 according to some example embodiments.

FIG. 6 is a bottom plan view of filter 500 according to some example embodiments.

FIG. 6 depicts body 502, bypass line 516, collection tray 528, first screen 530, second screen 532, throat 540, first manifold 542, and second manifold 544.

Figure 7:
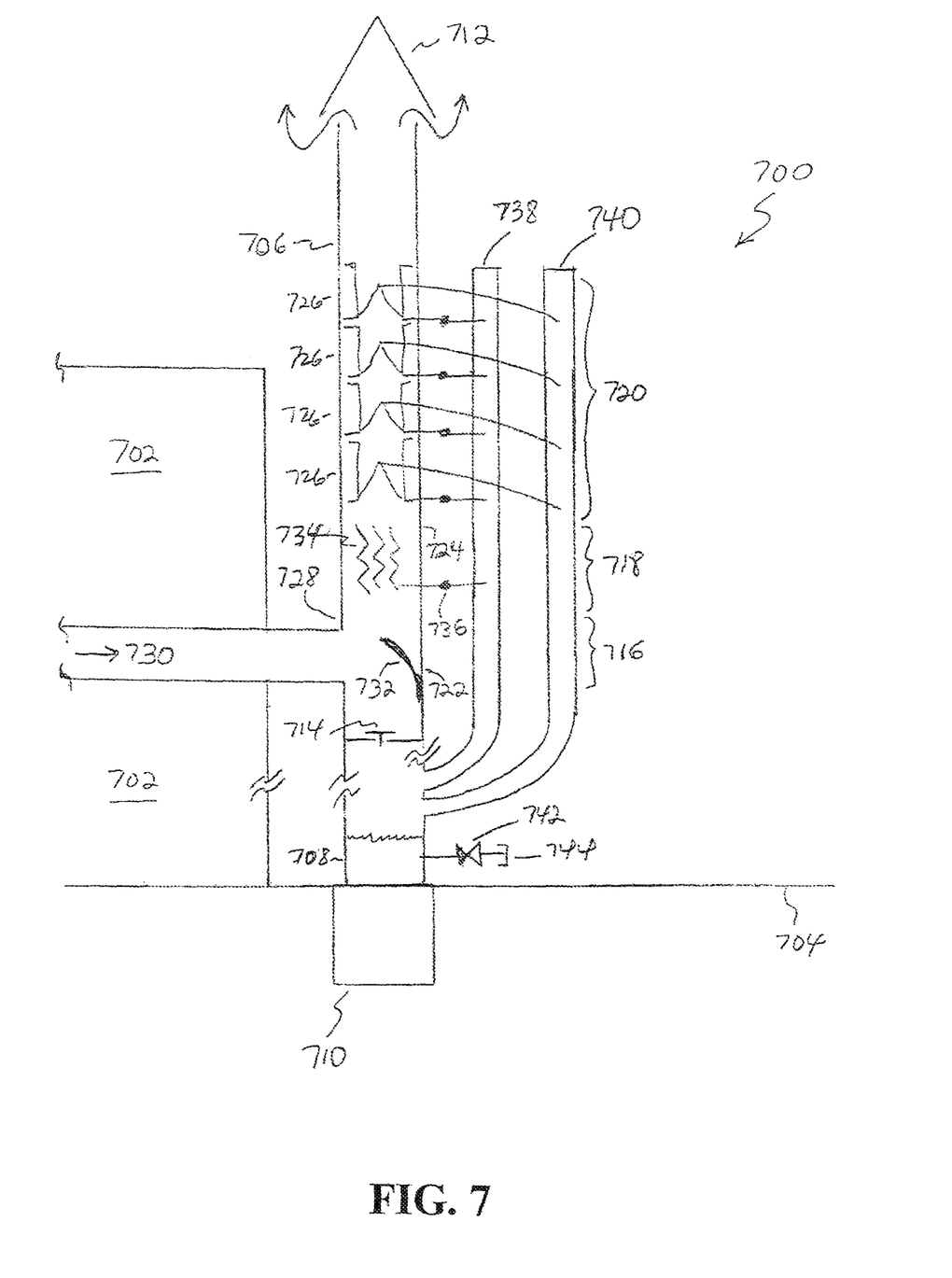
FIG. 7 is a cross-sectional view of a system for radioactive material capture according to some example embodiments.

FIG. 7 is a cross-sectional view of a system 700 for radioactive material capture according to some example embodiments.

System 700 may be a direct replacement of hardened vent piping currently existing at a nuclear power plant. In the alternative, system 700 may be disposed beside or in parallel with existing hardened vent piping so that gas flow may be diverted into the currently existing hardened vent piping, system 700, or both, depending on operational requirements.

As shown in FIG. 7, reactor building 702 may stand on grade 704. Hardened vent piping 706, that also may stand on grade 704, may be attached to reactor building 702 by, for example, standard pipe hangers. Hardened vent piping 706 may run from base 708, on seismic isolation structure 710, upward to vent 712.

Base 708 may be sealed and/or attached to seismic isolation structure 710 that may ensure structural integrity of system 700. Base 708 may collect water and solids. Base 708 may relieve pressure to hardened vent piping 706 and/or vent 712 through check valve 714. Check valve 714 may allow water to drain from upper portions of hardened vent piping 706 to base 708.

As shown in FIG. 7, system 700 may comprise particulate removal section 716, water removal section 718, and/or radionuclide removal section 720. Particulate removal section 716, water removal section 718, and radionuclide removal section 720 may be, for example, stacked in the order shown in FIG. 7 or some other order.

As shown in FIG. 7, system 700 may comprise one or more particulate removal devices 722, one or more water removal devices 724, and/or one or more radionuclide removal devices 726. One or more particulate removal devices 722, one or more water removal devices 724, and one or more radionuclide removal devices 726 may be, for example, stacked in the order shown in FIG. 7 or some other order. In particular, one or more particulate removal devices 722 may be mixed with one or more water removal devices 724, one or more particulate removal devices 722 may be mixed with one or more radionuclide removal devices 726, and/or one or more water removal devices 724 may be mixed with one or more radionuclide removal devices 726.

Due to the weight of particulate removal section 716, water removal section 718, and/or radionuclide removal section 720 or the weight of one or more particulate removal devices 722, one or more water removal devices 724, and/or one or more radionuclide removal devices 726, system 700 may comprise "T" device 728 that may allow gas flow upward and/or supports this weight.

When system 700 is in use, flow 730 from the containment (not shown) of reactor building 702 may be directed to perforated deflector shield 732 of "T" device 728, which may act as particulate removal section 716 and/or one or more particulate removal devices 722. Perforated deflector shield 732 may direct larger radioactive particulate downward. Perforated deflector shield 732 may allow smaller radioactive particulate, water vapor, and/or gases to flow upward into gas separator 734.

Gas separator 734, which may act as water removal section 718 and/or one or more water removal devices 724, may use "steam separator" technology known to a PHOSITA. Gas separator 734 may comprise inlet turning vanes (not shown), internal baffled/segmented metal sections (not shown) to capture water, internal flow paths on outer edges (not shown) to allow downward water flow, and upper turning vanes (not shown). The vertical extent of gas separator 734 may be determined so as to minimize thermophoretic forces by enhanced mixing and heat rejection via fins (not shown) along the vertical extent of gas separator 734.

Water removed by gas separator 734 may capture radioactive polar molecules that may then be conveyed via pipe and loop seal 736 to first manifold 738, which then may gravity drain to base 708.

Dewatered gas from gas separator 734 may flow upward to radionuclide removal section 720 and/or one or more radionuclide removal devices 726.

Gas from radionuclide removal section 720 and/or one or more radionuclide removal devices 726 may flow upward to vent 712. Gas exiting vent 712 may have significantly reduced content of radionuclides that are polar molecules soluble in the removed water.

In the event of large surges of gas flow, at least a portion of filter media stored in a first radionuclide removal device 726 may be advanced to a second radionuclide removal device 726 next in line above the first radionuclide removal device 726. As discussed above, at least a portion of filter media advanced to the second radionuclide removal device 726 may be directed to the throat of a perforated plate the second radionuclide removal device 726, into a discharge line of the second radionuclide removal device 726, on to a second outlet of the second radionuclide removal device 726, and then to second manifold 740, which may gravity drain to base 708. As known to a PHOSITA, inner diameter and/or smoothness of second manifold 740 may be selected so as to mitigate hold up of materials per normal solids handing techniques.

Although at least a portion of filter media may be removed from first radionuclide removal device 726, the at least a portion of filter media may retain captured radionuclides that diffused/adsorbed onto the surface of the at least a portion of filter media.

A majority of liquid capture may occur in gas separator 734, acting as water removal section 718 and/or one or more water removal devices 724. However, additional liquid capture may occur in radionuclide removal section 720 and/or one or more radionuclide removal devices 726. This continues the removal of radioactive polar molecules soluble in the removed water. The repeated instances of water removal increases the DF of system 700 as flow continues toward vent 712.

Radionuclide removal section 720 and/or one or more radionuclide removal devices 726 may use HEPA filters, as discussed above. However, because HEPA filters are susceptible to disintegration if wetted, one or more radionuclide removal devices 726 may need to be disposed closer to vent 712 so that the gas flowing through the HEPA filters is dry.

Hardened vent piping 706 may include connection valve 742 and/or connection 744, as discussed below.

Figure 8A:
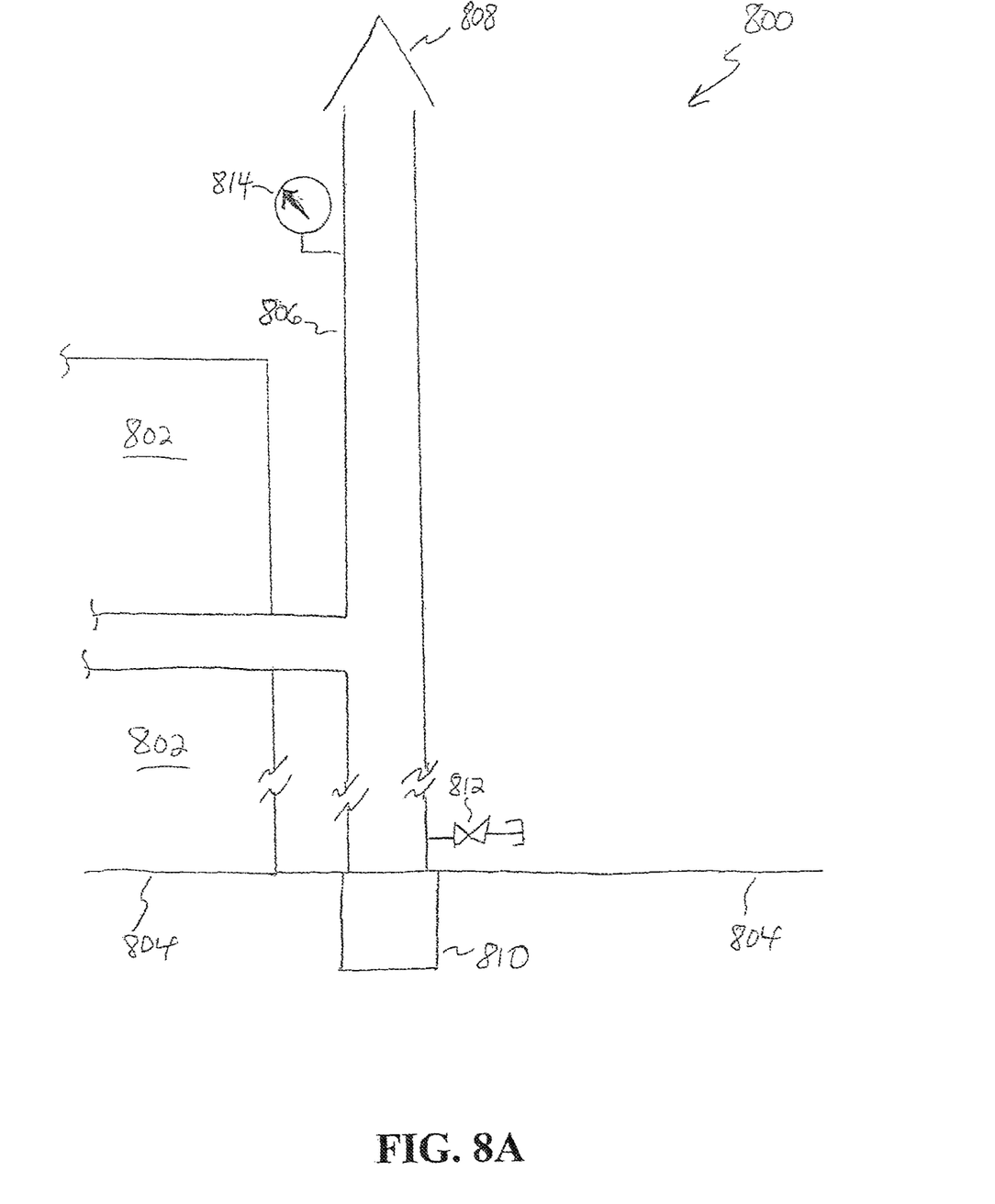
FIGS. 8A-8C are diagrams of primary operating modes of a system for radioactive material capture according to some example embodiments.
Figure 8B:
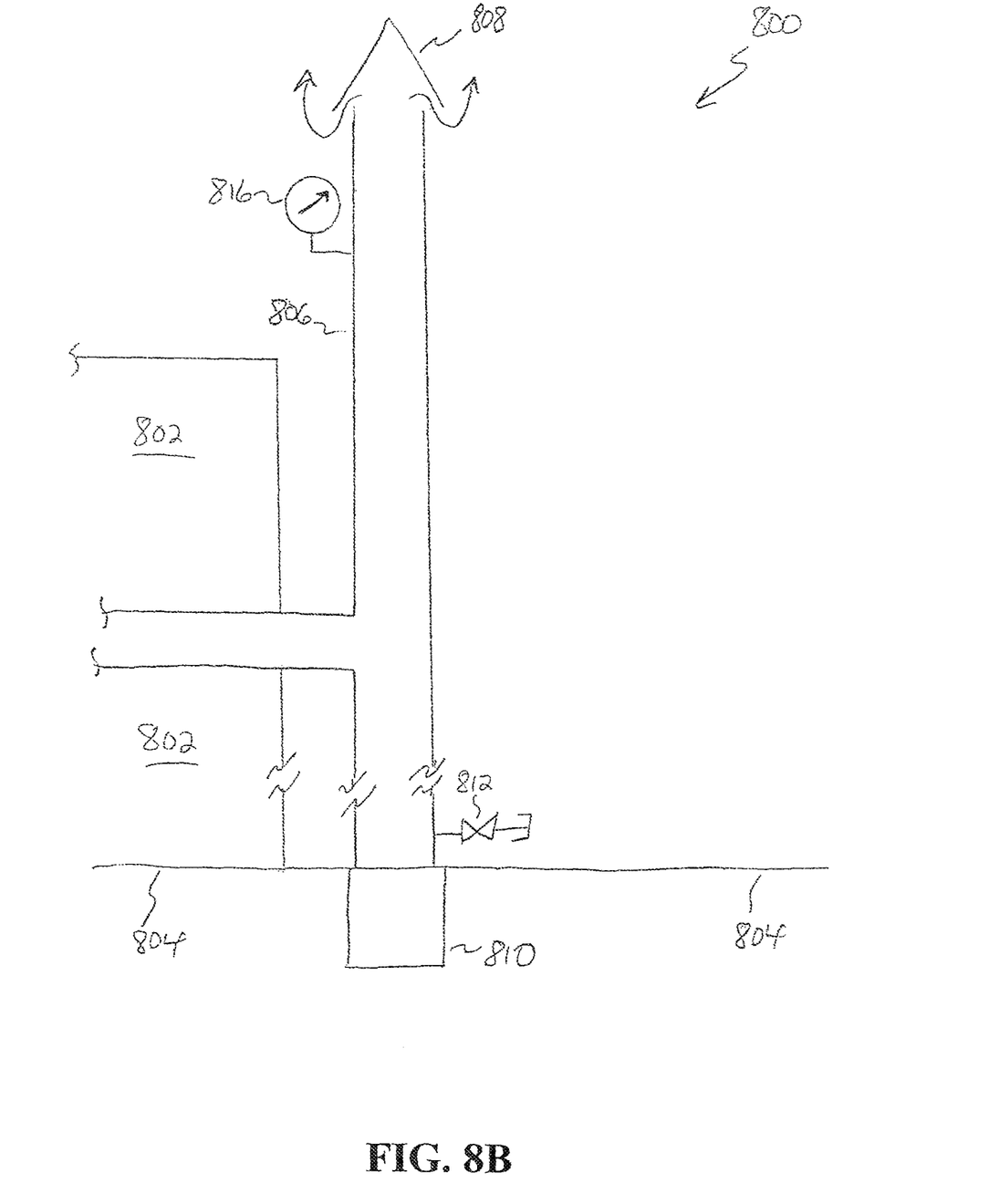
Figure 8C:
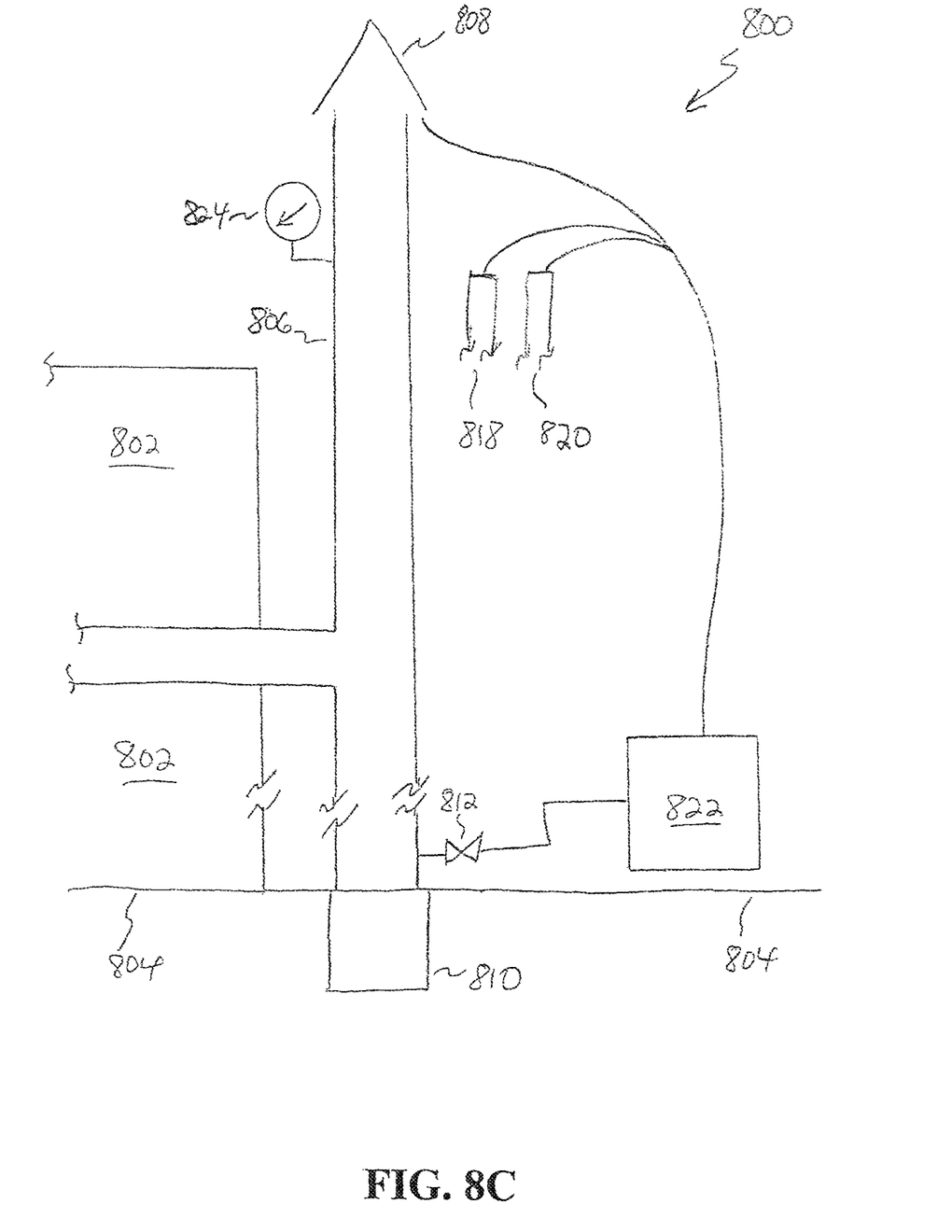

FIGS. 8A-8C are diagrams of primary operating modes of system 800 for radioactive material capture according to some example embodiments. FIGS. 8A-8C depict reactor building 802, grade 804, hardened vent piping 806, vent 808, seismic isolation structure 810, and connection valve 812.

System 800 may have three primary modes of operation: standby, activated, and/or recovery.

As shown in FIG. 8A, after installation, system 800 may be sealed in a sub-atmospheric condition or in an inerted condition at elevated pressure 814 with, for example, argon gas. Both the sub-atmospheric and inerted conditions may inform an operator whether system 800 in the standby mode is ready for operation in the activated mode. In the "no flow" situation of standby operating mode, stored filter media in system 800 retains its necessary original chemical and physical form.

As shown in FIG. 8B, system 800 may be activated due to a severe nuclear accident or other event that may require containment venting. Activation may result in increased pressure 816. Activation may result in gas flow from vent 808. When system 800 is activated, the dimensionless ratio DF may be defined by the amount of contaminant that enters system 800 divided by the amount of contaminant that leaves system 800 via vent 808. The DF may be controlled by combining, for example, multiple radionuclide removal devices in a radionuclide removal section (e.g., multiple radionuclide removal devices 726 in radionuclide removal section 720). System 800 may operate in the activated mode, independent of required operator action, until plant stability after a severe nuclear accident is regained by the operators, which may be measured in months, not mere days.

As shown in FIG. 8C, after plant stability is regained by the operators, the task of nuclear power plant facility cleanup and/or decommissioning may begin. Vent 808 may be sealed. Containment valves to system 800 may be closed so that recovery of radionuclides in system 800 may occur. Temporary piping may be connected to vent 808, connection valve 812, first manifold 818, and/or second manifold 820. Temporary tank 822 may be connected to the temporary piping.

Recovery may result in decreased pressure 824. Recovery may involve alumina beds and/or humate beds.

When the bulk of radioactive material has been removed from system 800, filters (e.g., filters 500) in hardened vent piping 806 may be sealed and removed. The filter media (e.g., filter media 522) and radioactive material collected in base 826 of hardened vent piping 806 may be treated by similar methods.

While example embodiments have been particularly shown and described, it will be understood by those of ordinary skill in the art that various changes in form and details may be made therein without departing from the spirit and scope of the present invention as defined by the following claims.

What is claimed is:

1. An exhaust stack of a nuclear containment building comprising:
 a system configured to passively filter radioactive materials from a flow, the system including,
  a perforated deflector shield configured to remove particulates of the radioactive materials from the flow by mechanical action; and
  one or more radionuclide removal devices configured to remove radioactive aerosols, reactive radioactive gases, or radioactive aerosols and reactive radioactive gases from the flow, the radionuclide removal devices including,
   a perforated plate defining a first section and a second section, the second section downstream of the first section, the perforated plate having a generally conical shape, a vertex of the perforated plate being downstream of and positioned above a base of the cone, the base of the cone defining an inlet through which the flow enters the first section before moving generally upwardly into the second section, and the perforated plate configured to remove water from the flow by mechanical action, and
   filter media in the second section, the system being a passive system, such that the system is configured to operate independent of operator action.

2. The exhaust stack of claim 1, wherein the radioactive materials comprise one or more of reactive gaseous radioactive materials, liquid radioactive materials, and particulate radioactive materials.

3. The exhaust stack of claim 1, wherein in a direction of the flow, the perforated deflector shield precedes the perforated plate.

4. The exhaust stack of claim 1, wherein in a direction of the flow, the perforated deflector shield precedes the one or more radionuclide removal devices.

5. The exhaust stack of claim 1, wherein the perforated deflector shield mechanically removes the particulates of the radioactive materials from the flow using gravitational settling.

6. The exhaust stack of claim 1, wherein in the perforated plate, mixing of the flow reduces thermophoretic forces within the flow.

7. The exhaust stack of claim 1, wherein heat rejection from the flow reduces thermophoretic forces within the flow.

8. The exhaust stack of claim 1, wherein mixing of the flow reduces thermophoretic forces within the flow.

9. The exhaust stack of claim 1, wherein in the at least one of the one or more radionuclide removal devices, heat rejection from the flow improves capture by reducing thermophoretic forces within the flow.

10. The exhaust stack of claim 1, wherein the filter media comprises one or more of activated alumina ($Al_2O_3$), activated charcoal, organic wax, and plastic.

11. The exhaust stack of claim 1, wherein the filter media comprises one or more high-efficiency particulate air (HEPA) filters.

12. A method for passively filtering radioactive materials from a flow in an exhaust stack of a nuclear reactor containment building, the method comprising:
 mechanically removing particulates of the radioactive materials from the flow using a perforated deflector shield;
 mechanically removing water from the flow using a perforated plate, the perforated plate defining a first section and a second section, the second section downstream of the first section, the perforated plate having a generally conical shape, a vertex of the perforated plate being downstream of and positioned above a base of the cone, the base of the cone defining an inlet through which the flow enters the first section before moving generally upwardly into the second section, and the perforated plate configured to remove water from the flow by mechanical action; and
 removing radioactive aerosols, reactive radioactive gases, or radioactive aerosols and reactive radioactive gases from the flow using filter media.

13. The method of claim 12, wherein the mechanically removing of the particulates of the radioactive materials from the flow precedes the mechanically removing of the water from the flow.

14. The method of claim 12, wherein the mechanically removing of the particulates of the radioactive materials from the flow precedes the removing of the radioactive aerosols, reactive radioactive gases, or radioactive aerosols and reactive radioactive gases from the flow using the filter media.

15. The method of claim 12, wherein the mechanically removing of the water from the flow precedes the removing of the radioactive aerosols, reactive radioactive gases, or radioactive aerosols and reactive radioactive gases from the flow using the filter media.

* * * * *